Aug. 9, 1938.  H. FRÖTSCHNER  2,125,908
ANALYZER
Filed Dec. 30, 1936

Inventor
Hellmuth Frötschner
by B. Singer
Attorney

UNITED STATES PATENT OFFICE 2,125,908

ANALYZER

Hellmuth Frötschner, Berlin-Steglitz, Germany, assignor to Zeiss Ikon Aktiengesellschaft, Dresden, Germany Application December 30, 1936, Serial No. 118,225
In Germany November 26, 1935

2 Claims. (Cl. 95—81)

The invention relates to improvements in analyzers for photographic purposes.

It is well known that light, when reflected onto non-metallic surfaces is partially polarized. Therefore, it is possible to eliminate a part of the annoying reflexes when photographing bright objects by arranging an analyzer (polarizer) in front of the photographic lens. The employment of analyzers for elminating reflexes or for improving the brilliancy of photographs with laterally extended reflecting surfaces has been proposed heretofore.

A very important object of the invention is to provide an analyzer of the type referred to with a mounting which may be attached to the photographic lens system and is provided with a scale which permits the determination of the position of the analyzer with respect to the object to be photographed or with respect to the camera.

Other objects will appear from the following description taken in connection with the accompanying drawing which illustrates by way of example one embodiment of the invention.

Figure 1:
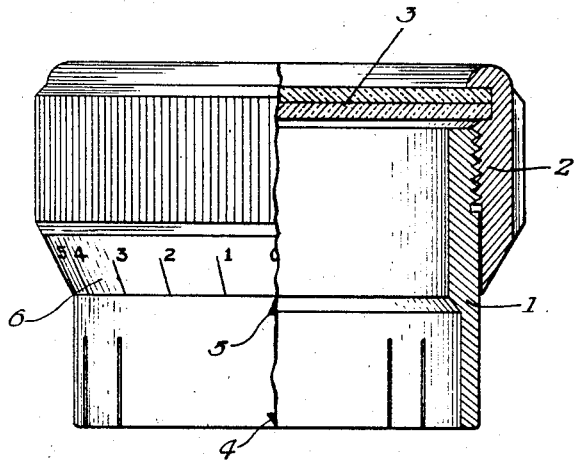
Fig. 1 is an elevational view of the analyzer, partly in section.
Figure 2:
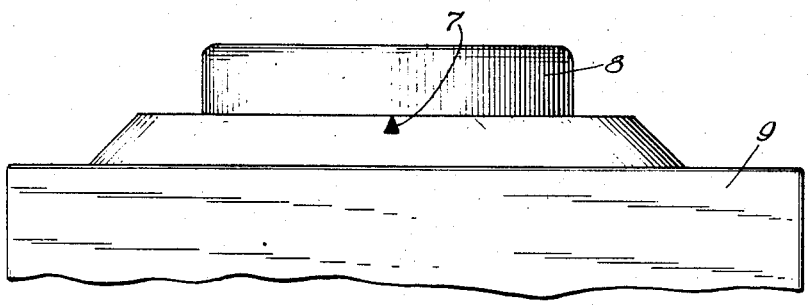
Fig. 2 shows diagrammatically a top plan view of a portion of a photographic camera and the lens system thereof to which the analyzer of the invention may be applied.

According to Fig. 1 the analyzer is provided with a mounting comprising a stationary tubular member 1 and a movable annular member 2 adapted to be rotatably adjustable with respect to the stationary member through an arc of at least 90°. The analyzer 3, composed of two clear glass plates cemented together and having a foil of polarizing particles between the same, is rigidly mounted in the opening of the movable annular member 2. The stationary tubular member 1 is adapted to be frictionally attached to and supported by the lens mounting 8 of a photographic camera indicated at 9. For this purpose, the wall at that end of the tubular member 1 adapted to engage the lens mounting 8 is reduced in thickness and is provided with axial slots to form a plurality of yieldable segments. The outer circumferential surface of the tubular member is provided with two marks 4 and 5 respectively, which for convenience sake may be arranged in axial alinement. One mark 4 is adapted to register with a mark 7 on the lens mounting 8 while the other mark 5 cooperates with a scale 6 on the rotatable member 2. It is obvious that when the mark 4 is always brought into register with the mark 7 on the lens mounting 8, that the tubular member 1 will always be in the same relative position with respect to the photographic lens and the camera, while the relative position of the analyzer 3 with respect to the photographic lens can be varied and is indicated on the scale 6 by the mark 5.

When photographing an object, scene or the like, the analyzer device is first brought before the eye of the photographer in order to determine the most favorable position of the analyzer 3. In the illustrated embodiment of the invention the tubular member 1 is maintained in a position in which the mark 5 points upwardly while the annular member 2 with the analyzer 3 is rotatably adjusted until the most favorable condition is obtained. The angle of rotation will be indicated by the scale 6. The analyzer device is then applied to the photographic lens by attaching the tubular member 1 to the lens mounting 8 and taking care that the relative position of the annular member 2 with respect to the tubular member 1 the same as it was when the analyzer was adjusted. The scale 6 on the annular member 2 facilitates the correct application of the analyzer to the photographic lens.

An analyzer of the same construction may, if desired, be mounted in front of the view finder of a camera or in front of an exposure meter provided with an observation hole or a peep hole in its rear wall. In these latter cases, the scale 6 on the rotatable annular member 2 is used for adjusting the analyzer in front of the photographic lens to the same position to which the analyzer in front of the finder or exposure meter has been adjusted.

What I claim is:

1. In combination with a photographic lens mounting, an analyzer disc and a mounting therefor, said analyzer mounting comprising two annular members rotatably adjustably connected with each other, one of said annular members having said analyzer disc rigidly attached thereto, the other said annular members being provided with means frictionally engaging said photographic lens mounting for supporting said analyzer disc in front of said lens mounting, said frictional engagement permitting a ready removal of said analyzer disc from said lens mounting, means on one of said annular members for indicating the relative angular position of said analyzer disc with respect to the other annular member, and cooperating indicating means on the annular member engaging said lens mounting and on said lens mounting for permitting the attachment of said last mentioned annular member to the lens mounting in a predetermined position.

2. In combination with a mounting for a photographic lens, an analyzer disc and a mounting therefor, said analyzer mounting comprising two annular members rotatably adjustably connected with each other, one of said annular members having said analyzer disc rigidly attached thereto, the other said annular members being provided with a cylindrical skirt-like portion frictionally engaging the circumference of said lens mounting and being readily detachable therefrom, means on one of said annular members for indicating the relative angular position of said analyzer disc with respect to the other annular member, and cooperating indicating means on the annular member engaging said lens mounting and said lens mounting for permitting the attachment of said last mentioned annular member to the mounting of the photographic lens in a predetermined position.

HELLMUTH FRÖTSCHNER.